Figure 1:
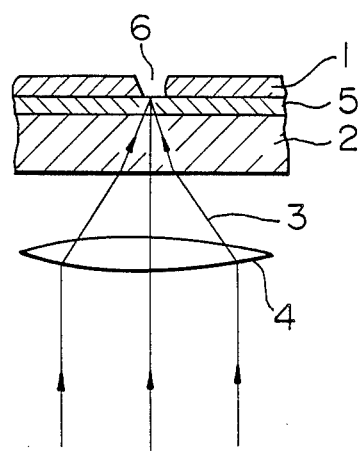

United States Patent [19]

Era et al.

[11] Patent Number: 4,942,073
[45] Date of Patent: Jul. 17, 1990

[54] OPTICAL DATA STORAGE MEDIUM

[75] Inventors: Susumu Era, Ichihara; Setsuo Kobayashi; Mariko Nakamura, both of Hitachi; Akio Mukoh, Mito, all of Japan

[73] Assignee: Hitachi, Ltd., Tokyo, Japan

[21] Appl. No.: 314,949

[22] Filed: Feb. 24, 1989

[30] Foreign Application Priority Data

Mar. 9, 1988 [JP] Japan ................... 63-53533

[51] Int. Cl.$^5$ .............................................. B32B 3/02
[52] U.S. Cl. ......................................... 428/64; 428/65;
428/195; 428/409; 428/333; 428/334; 428/335;
428/336; 428/457; 428/461; 428/446; 428/448;
428/913; 346/1.1; 346/766; 346/135.1;
430/945; 369/284; 369/288; 427/53.1; 427/55;
427/162; 427/240

[58] Field of Search .................. 235/487; 428/64, 65,
428/195, 409, 457, 461, 446, 448, 913, 333-336;
346/1.1, 76 L, 135.1; 430/945; 369/284, 288;
427/240, 162, 53.1, 54.1, 55, 56.1

[56] References Cited

U.S. PATENT DOCUMENTS 4,737,408  4/1988  Kuwahara et al. ................. 428/461
4,754,128  6/1988  Takeda et al. ....................... 235/487

Primary Examiner—Patrick Ryan
Attorney, Agent, or Firm—Antonelli, Terry, Stout & Kraus

[57] ABSTRACT

In an optical data storage medium comprising a resin, substrate, a primary coat formed thereon and a recording layer of a dye decomposable by a laser beam formed on the primary coat, said primary coat is a silicone resin layer whose surface had been subjected to a plasma treatment. The primary coat prevents the substrate from attack by solvent for forming the recording layer, and enables the recording layer to be uniform in thickness with good adhesion.

13 Claims, 1 Drawing Sheet

OPTICAL DATA STORAGE MEDIUM

The present invention relates to an optical data storage medium comprising, as the recording layer, a dye-containing thin organic film, and particularly relates to an optical data storage medium of heat mode type.

As a recording layer of heat mode type data storage media, a thin organic film containing an organic high-molecular compound or a dye is preferred for the superior recording sensitivity, because such a compound or dye has a small heat conductivity and a low melting or sublimation temperature. As such a dye, there have been proposed various substances such as cyanine dye, thiapyrylium dye, azulenium dye, squalium dye, chromicmethine dye, phthalocyanine dye, naphthalocyanine dye and the like, and vigorous researches are underway for the development of a data storage medium comprising a resin substrate and a recording layer formed thereon and composed mainly of said dye.

However, in producing such a data storage medium by forming, on a resin substrate, a film as a recording layer consisting of a dye or a dye-containing composition, there have been such problems as the surface of the resin substrate is attacked by the solvent used for coating said dye on the substrate surface resulting in, for example, reduction in the reflectance of recording layer and reduction in the S/N ratio of reading.

In order to solve these problems, it was proposed to form a primary coat of titanium oxide [Japanese patent application Kokai (Laid-Open) No. 127244/1984)] or of silicon oxide [Japanese patent application Kokai (Laid-Open) No. 204395/1985)] between a resin substrate and a recording layer. In forming such a primary coat, however, the coating of titanium oxide or silicon oxide as a primer is difficult and requires the use of a vapor deposition method or a sputtering method, and hence no satisfactory data storage medium containing a primary coat has been obtained. Further, $TiO_2$ or $SiO_2$ has no sufficient adhesion to a resin substrate.

Accordingly, it is an object of the present invention to provide an optical data storage medium comprising a resin substrate and a recording layer of excellent reproduction property formed thereon with stable and good adhesion. It is another object of the present invention to provide a process for producing said data storage medium. Still further object of the present invention is to provide a method for optical data storage using said medium.

The present invention lies in an optical data storage medium comprising a resin substrate, a primary coat formed thereon and a recording layer of a dye or dye composition formed on said primary coat which is decomposed or melted by a laser beam, characterized in that the primary coat comprises a silicone resin layer whose surface had been subjected to a plasma treatment.

The preferred embodiments of the present invention are illustrated with reference to the accompanying drawing. FIG. 1 is a drawing schematically showing a constitution of an optical data storage medium of the present invention and a method for data storage using said medium.

In the drawing, 1 is a recording layer; 2 is a substrate; and 5 is a primary coat. This data storage medium has such a constitution that a recording layer is formed on a substrate via a primary coat. Storage of data in this medium is effected by converging a laser beam 3 on the recording layer 1 by a converging lens 4 to form pits 6 in the recording layer 1.

In the present invention, the primary coat comprises a silicone resin layer whose surface had been subjected to a plasma treatment. The silicon resin may be any as long as it can be coated in a solution type. Ordinarily, there is particularly preferred a two-component type silicone resin solution which is used for forming hard coating on lens by curing at a temperature of 150° C. or below.

The dried or cured silicone resin layer is subjected to a plasma treatment at the surface. This is effected in order to improve wettability of a coating fluid for formation of the recording layer comprising a dye or a dye composition, and to enable the formation of a uniform recording layer. The plasma treatment is effected under a reduced pressure until the contact angle of water at the treated surface of the silicone resin layer becomes 40° or less, whereby the recording layer formed on the silicone resin layer has good adhesion to the latter and a data storage medium having a recording layer of uniform thickness can be obtained. The contact angle of water of 40° corresponds to a contact angle of water on a glass having no particular surface treatment.

In the present invention, the plasma treatment of the surface of the silicone resin primary coat can be effected by the use of a stable plasma, for example, a low temperature plasma generated by a glow discharge. Such a low temperature plasma can be usually obtained by applying voltage to a gas under a reduced pressure of, preferably, 100 Torr or less. The voltage can be applied through electrodes, using a commercially available plasma generator of radio frequency region (e.g. 90 KHz –13.56 MHz) with a tuning circuit. As the electrodes, there can be used, for example, coil-shaped electrodes and parallel plate electrodes. The electrodes can be provided inside or outside of a reduced pressure tank.

The gas as the plasma source can be any gas such as hydrogen, methane, nitrogen, argon, oxygen or the like, and oxygen is preferred particularly. A stable plasma can be obtained by selecting a gas pressure in compliance with shape of plasma generator, shape and gap of electrodes, the voltage applied, etc. The conditions for plasma generation can be appropriately selected usually between 50 V and 1,000 V, and the current of between 10 mA and 10 A. The time for plasma treatment is appropriately selected so as 40° or less contact angle of water on the primary coat after plasma treatment is obtainable. The time may be 5 seconds to 10 minutes though it depends upon the voltage applied, etc.

Thickness of the primary coat is preferably 50 –1,000 Å, particularly preferably 100–500 Å. When the thickness is smaller than 50 Å, the substrate has insufficient solvent resistance. When the thickness is larger than 1,000 Å, pregrooves in the substrate are filled and the tracking becomes disordered.

In the present invention, the recording layer is a thin layer comprising a dye or dye composition which is melted or decomposed by a laser beam. As the dye used in the recording layer, there can be mentioned cyanine dye, thiapyrylium dye, azulenium dye, squalium dye, chromicmethine dye, phthalocyanine dye, naphthalocyanine dye, tetradehydrocholine or tetradehydrocholol dye, anthraquinone dye, azo dyes, triphenylmethane dye, etc. Of these, cyanine dye and naphthalocyanine dye are preferred. In particular, the naphthalocyanine dye represented by the following formula [I] is excellent because it provides a uniform film of high reflectance and it is not necessary to arrange a metallic reflector. Therefore, the sensitivity and the C/N ratio of reproduction are better than the case using a reflector.

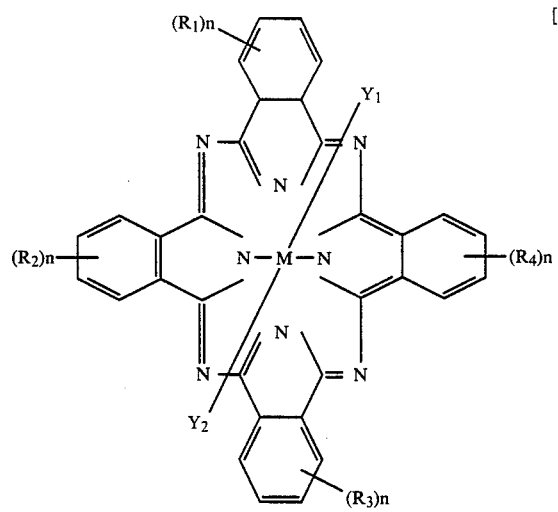

In the above formula [I], $R_1$ to $R_4$ which may be the same or different is each selected from the group consisting of a straight chain or branched chain alkyl group, an alkoxy group and halogen atom; n is the same or different integer of 0–4; $Y_1$ and $Y_2$ which may be the same different are each a group selected from the group consisting of —R, —Ar, —OR, —OAr, —OSi(R)$_3$ and —OSi(Ar)$_3$ (R is a $C_{1-18}$ straight chain or branched chain alkyl group and Ar is a group selected from the group consisting of phenyl group and substituted phenyl groups); and M is an element selected from the group consisting of Al, Si Ge and Sn with the proviso that when M is Al, only $Y_1$ bonds to M.

In the above formula (I), examples of $R_1$ to $R_4$ are methyl group, ethyl group, propyl group, isopropyl group, n-butyl group, tert-butyl group, n-pentyl group, sec-amyl group, tert-amyl group, tert-heptyl group, tert-octyl group, tert-dodecyl group, methoxy group, ethoxy group, propoxy group, isopropoxy group, butoxy group, amyloxy group, chlorine, bromine and fluorine. Examples of $Y_1$ and $Y_2$ are methyl group, ethyl group, ethoxy group, methoxy group, pentoxy group, octoxy group, phenoxy group, octadecyloxy group, trimethylsilyloxy group, triethylsilyloxy group, triphenylsilyloxy group, tri(n-hexyl)silylethoxy group and triphenylmethyloxy group.

Specific examples of the phthalocyanine compound represented by the above formula [I] include the followings.

(1) PcSi[OSi(n-$C_6H_{13}$)$_3$]$_2$

Bis(trihexylsilyloxy)siliconphthalocyanine (Pc refers to a phthalocyanine skeleton. The same applies to hereinafter.)

(2) PcSi[OSi($C_2H_5$)$_3$]$_2$

Bis(triethylsilyloxy)siliconphthalocyanine (3) PcSi(O$C_6H_5$)$_2$

Bisphenoxysiliconphthalocyanine (4) PcSi[OSi($C_6H_5$)$_3$]$_2$

Bis(triphenylsilyloxy)siliconphthalocyanine (5) PcSn[OSi($C_2H_5$)$_3$]$_2$

Bis(triethylsilyloxy)tinnaphthalocyanine (6) (t-Bu)$_4$PcSi[OSi($C_2H_5$)$_3$]$_2$ Bis(triethylsilyloxy)silicon-tetrakis(t-butyl)phthalocyanine (7) (t-Bu)$_4$PcGe[OSi($C_4H_9$)$_3$]$_2$ Bis(tributylsilyloxy)germanium-tetrakis(t-butyl)phthalocyanine (8) (t-Bu)$_4$PcSn[OSi($C_6H_{13}$)$_3$]$_2$ Bis(trihexylsilyloxy)tin-tetrakis(t-butyl)phthalocyanine (9) PcAlO$C_6H_5$ Phenoxyaluminumphthalocyanine

(10) Cl$_4$PcSi[OSi($C_8H_{17}$)$_3$]$_2$

Bis(trioctylsilyloxy)silicon-tetrachlorophthalocyanine

These phthalocyanine compounds can be produced, for example, by a process described in J. Am. Chem. Soc., 1984, Vol. 106, pp. 7404–7410, or by a process described in Inorg. Chem., 1967, Vol. 6, pp. 1869–1872.

The recording layer of the present invention may contain other dyes to the extent that the effect of the present invention is impaired. The recording layer may further contain, if necessary, a resin for binder, etc. As the resin, there are preferably used autooxidative, depolymerizable or thermoplastic resins. Specific examples of these resins include a polyolefin, a polyolefin copolymer, a vinyl chloride copolymer, a vinylidene chloride copolymer, a styrene polymer, a styrene copolymer, an acrylic polymer, an acrylic copolymer, a polyvinyl ether, a polyether, a polyurethane, a xylene resin, a terpene resin, a petroleum resin and a cellulose derivative.

The solvent used for coating includes, for example, ketones such as methyl ethyl ketone, methyl isobutyl ketone, cyclohexanone and the like, esters such as butyl acetate, ethyl acetate, carbitol acetate, butylcarbitol acetate and the like, ethers such as methyl cellosolve, ethyl cellosolve and the like, hydrocarbons such as toluene, xylene and the like, halogenated hydrocarbons such as dichloroethane, trichloroethane, chloroform and the like, and alcohols.

In forming the recording layer, a known solution coating method is employed. In particular, a spin coating method is preferred.

The thickness of the recording layer is preferably 300–2,000 Å, particularly preferred is 500–1,000 Å.

The material of the substrate used in the present invention may be known resin materials such as acrylic resin, polycarbonate resin, olefinic resin, epoxy resin and the like. Of these, acrylic resins and polycarbonate resins are superior in that they are liable to be attacked by solvents used for forming the recording layer, and so a significant solvent-resistant effect by the primary coat is exhibited.

The substrate may be transparent or opaque to the laser beam used. When writing and reading are conducted with a laser beam from the substrate side of the data storage medium, the substrate must transmit the laser beam. When writing and reading are conducted from the recording layer side, the substrate need not transmit the laser beam. As necessary, the substrate may be provided with, for example, guide grooves consisting of convexes and concaves or wobbled guide pits for tracking.

In the data storage medium of the present invention, storage of data is conducted by applying a laser beam to the medium and melting or decomposing the recording layer by the heat of the beam to form pits of about 0.6–1.0 μm in size, and reproduction of stored data is conducted by detecting the difference in amount of refected light between the pits-formed portion and the no-data-stored portion. The laser beam for data reproduction can be applied from the recording layer side, however, when the substrate is transparent, it can be applied from the substrate side.

The present invention is suitable for use in an optical disk system employing a laser beam of 600–900 nm, preferably 680–850 nm wavelength.

The laser beam can be selected depending upon the absorption wavelength of the dye compound used.

It is possible that the two optical data storage media of the present invention be arranged in parallel so that their recording layers face each other via an air space (air sandwich type), or be arranged in one piece so that their recording layers adhere each other via a protective film layer.

In the present invention, the silicone resin as a primary coat gives substantially no effect on the resin substrate and moreover is stable to the dye or dye composition constituting the recording layer as well as to the solvent used for dissolving or suspending the dye or dye composition in forming the recording layer, therefore, the substrate has no fear of being attacked In addition, the surface of the silicone resin primary coat is subjected to a plasma treatment and thereby the water repellency, etc. inherently possessed by the silicone resin are reduced, so that the recording layer formed on the primary coat is uniform in thickness and has good adhesion to the primary coat.

The present invention is described in more detail below referring to non-resistrictive Examples.

EXAMPLE 1

On an injection molded polycarbonate substrate of 63.5 mm in diameter and 1.2 mm in thickness, was spin-coated an ethanol solution of a primer having a resin content of 0.8% by weight (PC-10 manufactured by Shin-Etsu Chemical Co., Ltd.). The coated substrate was allowed to stand for 5 minutes at room temperature and then kept for 30 minutes at 120° C. Separately, a silicone resin having a resin content of 26% by weight [X-12-2150 (A) manufactured by Shin-Etsu Chemical Co., Ltd.] and a silicone resin having a resin content of 2% by weight [X-12-2150 (B) manufactured by the same company] were mixed in a ratio of 100:4, and the mixture was diluted 10-fold with ethanol to obtain a solution. The solution was spin-coated on the coated substrate prepared above.

The silicone resin coated substrate was kept for 1 hour at 130° C. and then subjected to an $O_2$ plasma treatment. The plasma treatment was conducted by placing the coated and heat-treated substrate in a plasma reactor (PR-501L manufactured by Yamato Kagaku K. K. giving an oscillation frequency of 13.56 MHz); reducing inside pressure of the reactor to 0.1 Torr; introducing thereinto oxygen gas at a rate of 200 ml/min and applying a high frequency of 200 W for 2 minutes. The resulting primary coat had a thickness of 320 Å.

The surface of the primary coat after plasma treatment was tested for contact angle of water. It was 6° as compared with 88° before the treatment.

On the surface of the primary coat after plasma treatment was spin-coated a solution of 1.5% by weight of cyanine dye (NK 2014 manufactured by Nihon Kanko Shikiso Kenkusho) dissolved in dichloroethane, to form a recording layer. The resulting recording layer had a thickness of 780 Å.

The thus obtained data storage medium was irradiated with a semiconductor laser beam of 830 nm wavelength from the substrate side. Recording was capable at 8 mW and 100 ns.

COMPARATIVE EXAMPLE 1

On an injection molded polycarbonate substrate of 63.5 mm in diameter and 1.2 mm in thickness, was spin-coated the above mentioned solution of 1.5% of cyanine dye dissolved in dichloroethane. However, the substrate surface was partially dissolved and damaged and, as a result, no data storage medium having a good surface was obtained.

COMPARATIVE EXAMPLE 2

The same procedure as in Example 1 was effected except that no $O_2$ plasma treatment was applied to the surface of the primary coat. However, the spin-coating of the cyanine dye solution on the primary coat could not be effected satisfactorily because the solution was repelled on the primary coat and no smooth and uniform film was obtained.

EXAMPLE 2

On an injection molded polycarbonate substrate of 63.5 mm in diameter and 1.2 mm in thickness, was spin-coated an ethanol solution of a primer (PC-10 with resin content of 0.5% by weight). The coated substrate was allowed to stand for 5 minutes at room temperature and then kept for 30 minutes at 120° C. Separately, a silicone resin [X-12-2150 (A) manufactured by Shin-Etsu Chemical Co. Ltd.] and a silicone resin [X-12-2150 (B) manufactured by the same company] were mixed in a ratio of 100:4, and the mixture was diluted 30-fold with ethanol to obtain a solution. The solution was spin-coated on the coated substrate prepared above.

The silicon resin-coated substrate was kept for 1 hour at 130° C. and then subjected to an $O_2$ plasma treatment for 1 minute. The plasma treatment was conducted in the same manner as in Example 1. On the surface of the primary coat after plasma treatment was spin-coated a solution of 0.5% by weight of bis(trihexylsilyloxy)-siliconnaphthalocyanine dissolved in chloroform to form a recording layer. The primary coat and recording layer had thicknesses of 280 Å and 330 Å, respectively. The thus obtained data storage medium was irradiated with a semiconductor laser beam of 830 nm wavelength to evaluate the recording property. Recording was capable at 9 mW and 100 ns.

EXAMPLE 3

A 10:1 mixture of a silicone resin [X-12-1100 (A) manufactured by Shin-Etsu Chemical Co., Ltd.) and a silicone resin [X-12-1100 (B) manufactured by the same company] was diluted 30-fold with isopropyl alcohol. The diluted mixture was spin-coated on an injection molded polymethylmethacrylate substrate of 130 mm in diameter with pregrooves. The coated substrate was allowed to stand for 30 minutes at room temperature and then kept for 2 hours at 80° C., after which it was subjected to the same $O_2$ plasma treatment as in Example 1 for 2 minutes. On the thus formed primary coat was formed, by spin coating, the same cyanine dye recording layer as in Example 1. The resulting data storage medium was evaluated for recording characteristics. Recording was capable at a line speed of 8 m/s and a recording power of 10 mW, and a C/N ratio of 48 dB was obtained.

EXAMPLE 4

To a mixture consisting of 26 g of o-phthalonitrile and 50 g of quinoline was added 85 g of silicon tetrachloride. The resulting mixture was refluxed for 4 hours. The resulting black tar-like mixture was repeatedly washed with acetone and dimethyl sulfoxide to obtain about 1 g of a dark violet solid of dichlorosiliconphthalocyanine. The solid was washed with pyridine and then refluxed with 20 ml of a 1:1 mixture of pyridine and a concentrated aqueous ammonia solution to obtain a blue crystal of dihydroxysiliconphthalocyanine. The product was treated with a mixture of molten phenol and a small amount of pyridine and, after cooling, washed with benzene to obtain bisphenoxysiliconphthalocyanine.

To 0.25 g of the above dihydroxysiliconphthalocyanine, 1.0 g of triphenylsilanol and 10 drops of pyridine were added and refluxed for about 1 hour. Excessive silanol was removed by washing with hot xylene, and the residue (solid) was washed with hot benzene, ethanol and acetone to obtain about 0.1 g of bis-(triphenylsilyloxy)siliconphthalocyanine.

The same procedure as in Example 1 was conducted except that the above bis-(triphenylsilyloxy)siliconphthalocyanine was evaluated for recording characteristics using a semiconductor laser beam of 830 nm wavelength. Recording was capable at 8 mW and 100 ns.

The recording layer of the medium had a good compatibility with the plasma-treated surface of the silicone resin primary coat and was uniform. The recording layer had a high reflectance, and accordingly had an excellent regeneration property.

We claim:

1. An optical data storage medium comprising a resin substrate, a primary coat formed thereon and a recording layer of a dye or dye composition formed on said primary coat which is decomposed or melted by a laser beam, characterized in that the primary coat comprises a silicone resin layer whose surface had been subjected to a plasma treatment.

2. An optical data storage medium according to claim 1, wherein the primary coat has a thickness of 100–500 Å and the recording layer has a thickness of 500–1,000 Å.

3. An optical data storage medium according to claim 1 or 2, wherein the primary coat is a silicone resin layer whose surface had been subjected to a plasma treatment so that the contact angle of water at the surface is 40° or less.

4. An optical data storage medium according to claim 3, wherein the recording layer consists of a film comprising a phthalocyanine dye represented by the following formula [I]:

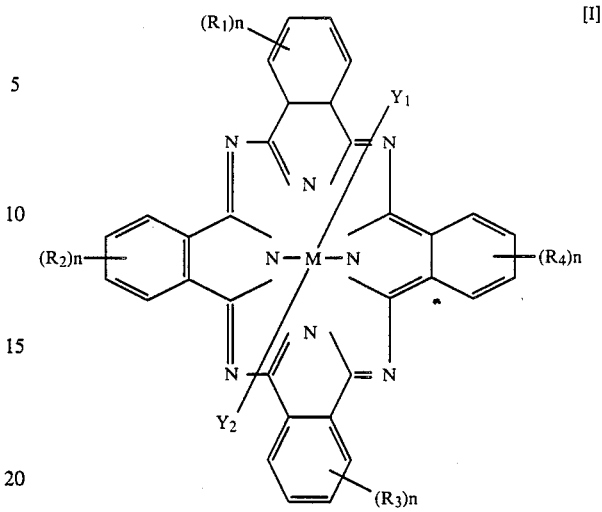

wherein $R_1$ to $R_4$ which may be the same or different is each selected from the group consisting of straight chain or branched chain alkyl group, an alkoxy group and a halogen atom; n is the same or different integer of 0–4; $Y_1$ and $Y_2$ which may be the same or different are each a group selected from the group consisting of —R, —Ar, —OR, —OAr, —OSi(R)$_3$ and —OSi(Ar)$_3$ (R is a $C_{1-18}$ straight chain or branched chain alkyl group, and Ar is a group selected from the group consisting of phenyl group and substituted phenyl groups); and M is an element selected from the group consisting of Al, Si, Ge and Sn with the proviso that when M is Al, only $Y_1$ bonds to M.

5. An optical data storage medium according to claim 1 or 2, wherein the resin substrate transmits a light for data storage or reproduction.

6. An optical data storage medium according to claim 1, wherein the dye of the recording layer is selected from the group consisting of a cyanine dye and a phthalocyanine dye.

7. An optical data storage medium according to claim 1 or claim 8, wherein the dye of the recording layer is a phthalocyanine dye represented by the following formula [I]:

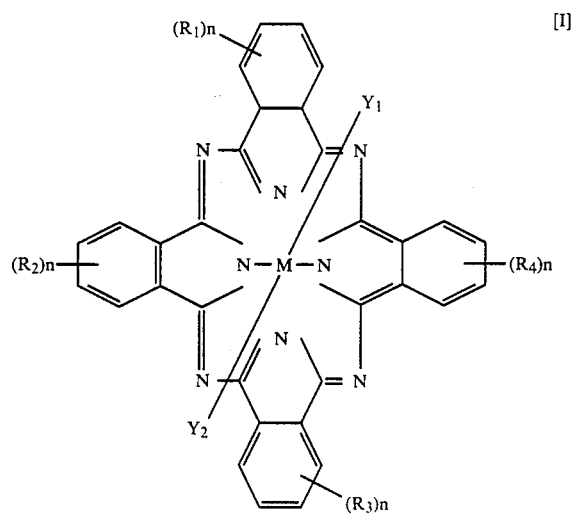

wherein $R_1$ to $R_4$ which may be the same or different is each selected from the group consisting of straight chain or branched chain alkyl group, an alkoxy group and a halogen atom; n is the same or different integer of 0-4; $Y_1$ and $Y_2$ which may be the same or different are each a group selected from the group consisting of —R, —Ar, —OR, —OAr, —OSi(R)$_3$ (R is a $C_{1-18}$ straight chain or branched chain alkyl group, and Ar is a group selected from the group consisting of phenyl group and substituted phenyl groups); and M is an element selected from the group consisting of Al, Si Ge and Sn with the proviso that when M is Al, only $Y_1$ bonds to M.

8. An optical data storage medium comprising a resin substrate, a silicone resin primary coat formed on the substrate, said primary coat having a plasma treated surface, and a recording layer of dye formed by applying a solution of the dye on the plasma treated primary coat; said primary coat consisting of a silicon resin layer, the surface of which has been subjected to a plasma treatment so that the contact angle of water at the surface is 40° or less.

9. An optical data storage medium according to claim 7, wherein the primary coat has a thickness of 100-500 Å and the recording layer has a thickness of 500-1,000 Å.

10. A process for producing an optical data storage medium comprising a resin substrate, a primary coat formed thereon and a recording layer of a dye or dye composition formed on said primary coat which is decomposed or melted by a laser beam, which process comprises steps of:

(a) coating a silicone resin solution on a resin substrate and drying or curing the coated solution to form on the substrate a primary coat consisting of a thin silicone resin layer, and (b) subjecting the primary coat to a plasma treatment under a reduced pressure of 100 Torr or less until the contact angle of water at the surface of the treated primary coat becomes 40° or less.

11. A method for storing in an optical data storage medium comprising a resin substrate, a primary coat formed thereon and a recording layer of a dye or dye composition formed on said primary coat which is decomposed or melted by a laser beam, characterized in that a laser beam of 680-850 nm wavelength is employed.

12. A process for producing an optical data storage medium according to claim 6, further comprising the steps of:

(c) applying a solution of said dye or dye composition by spin coating to said plasma treated surface to form the recording layer; said solution containing a solvent selected from the group consisting of a ketone, an ester, an ether, a hydrocarbon, a halogenated hydrocarbon and an alcohol.

13. A process for producing an optical data storage medium according to claim 12, wherein said solvent is selected from the group consisting of methyl ethyl ketone, methyl isobutyl ketone, cyclohexanone, butyl acetate, ethyl acetate, carbitol acetate, butylcarbitol acetate, methyl cellosolve, ethyl cellosolve, toluene, xylene, dichloroethane, trichloroethane, chloroform and ethanol.

* * * * *